March 7, 1933.    L. O. GRONDAHL ET AL    1,900,411
ELECTRIC CONTROL SYSTEM
Filed Nov. 10, 1931    3 Sheets-Sheet 1

Fig. 1.

INVENTORS.
Lars O. Grondahl and
Andrew J. Sorensen.
By
THEIR ATTORNEY.

Fig. 3.

Patented Mar. 7, 1933

1,900,411

UNITED STATES PATENT OFFICE

LARS O. GRONDAHL AND ANDREW J. SORENSEN, OF PITTSBURGH, PENNSYLVANIA, ASSIGNORS TO THE UNION SWITCH & SIGNAL COMPANY, OF SWISSVALE, PENNSYLVANIA, A CORPORATION OF PENNSYLVANIA

ELECTRIC CONTROL SYSTEM

Application filed November 10, 1931. Serial No. 574,093.

Our invention relates to electric control systems, and particularly to electric control systems for the control of the brakes of railway trains.

We will describe certain forms of apparatus embodying our invention, and will then point out the novel features thereof in claims.

In the accompanying drawings.

The communicating channel for communicating from the locomotive to the caboose may take different forms but a preferred from is that disclosed and claimed in the L. O. Grondahl application for Letters Patent, Serial No. 450,135, filed May 6, 1930, for electric train signaling system.

In each of the several views like reference characters indicate like parts.

Figure 1:
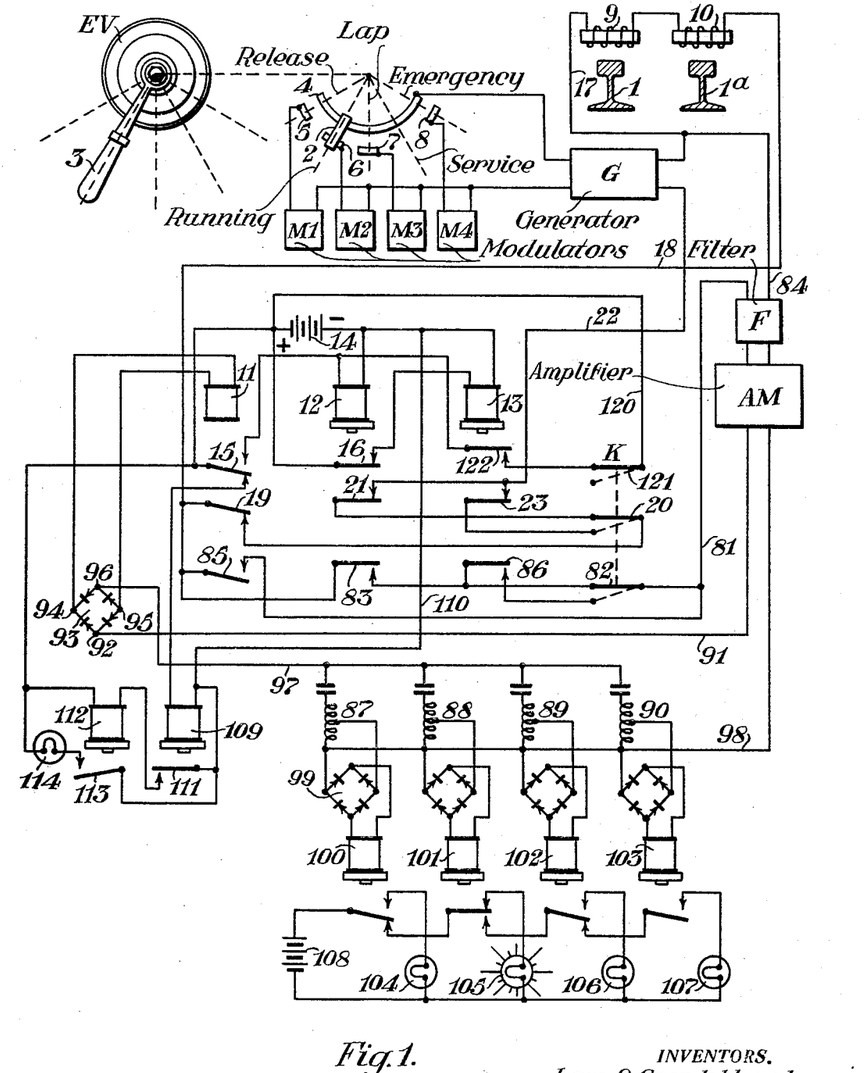
Fig. 1 is a diagrammatic view showing one form of the locomotive carried apparatus of our invention for transmitting an influence to the auxiliary brake controlling mechanism.

Referring to Fig. 1, the reference character EV designates a standard engineer's brake valve capable of establishing the usual release, running, lap, service and emergency conditions of the brake pipe pressure. As shown schematically the contactor 2 is connected to and actuated by the handle 3 of the brake valve EV. Contactor 2 is adapted to engage an arcuate contact 4 in all positions of handle 3 and to engage contacts 5, 6, 7 and 8 in the release, running, lap and emergency positions, respectively.

The locomotive is provided with a generator G of alternating current of a carrier frequency such for example as five thousand cycles per second. The carrier current is to be modulated in the usual manner by any one of several modulators M1, M2, M3 and M4 which may be generators of low frequency current of say 20, 30, 40 and 50 cycles per second, respectively. The generator G and the modulators may be any one of many well-known types among which is the vacuum tube type. As the specific type of neither the generator nor the modulators forms a part of our invention these devices are shown diagrammatically only in Fig. 1 in order to simplify the drawing as much as possible. It will be understood, of course, that our invention is in no manner limited to the above mentioned frequencies but that these frequencies are given by way of illustration only.

The different modulators are made active to modulate the carrier current in accordance with the condition of the brake valve EV. The circuits for connecting the modulators to the generator G are easily traced and it is thought only necessary to point out that with the handle 3 placed in the release position where contactor 2 engages contacts 4 and 5 the circuit to the modulator M1 is closed. When handle 3 occupies the running position where contactor 2 engages contacts 4 and 6 the circuit to the modulator M2 is closed, and in like manner when handle 3 occupies the lap and emergency positions the circuits to the modulators M3 and M4, respectively, are closed. It will be noted that for the service position of the handle 3 there is no circuit provided and thus the carrier current supplied by the generator G is not modulated for the service condition of the brake valve EV. It follows from the foregoing that the output of the generator G will be modulated at the frequency of M1, M2, M3 or M4 according as the handle of the engineer's brake valve is in the release, running, lap or emergency position, and non-modulated when the handle 3 is in the service position.

Mounted on the locomotive are inductor coils 9 and 10 positioned in an inductive relation with the traffic rails 1 and $1^a$, respectively. By means of three relays 11, 12 and 13 these inductor coils 9 and 10 are at times connected to the output of the generator G. At the outset the relays 11, 12 and 13 will be deenergized so that as the system is cut into service by the closing of a common starting switch not shown in the figure, current flows from the positive terminal of the battery 14 along wire 120, contact 121 of a manually operated signal key K, back contact of armature 122 of relay 13, and winding of relay 12 to the negative terminal of battery 14. When relay 12 is picked up, it closes a simple circuit to the winding of relay 13 at the front contact of its armature 16 to energize that relay by current from the battery 14. As relay 13 picks up, it opens the circuit to the relay 12 at the back contact of its armature 122. Relays 12 and 13 are provided with slow-release characteristics and thus at the outset these two relays will repeat the cycle of being successively energized and deenergized in the manner just pointed out until the relay 11 is operated, it being understood, of course, that the starting switch when closed to cut the system into service, remains constantly closed until such time as the system is to be cut out of service.

With the relay 11 energized in a manner to be later described current flows from the battery 14 through the front contact of armature 15 of relay 11 to the winding of relay 12, back to the battery 14. As described above, when the relay 12 picks up, a circuit is closed from the battery 14 through the front contact of the armature 16 to the relay 13 to energize that relay. As both the relays 12 and 13 are provided with slow-release characteristics it is clear that these two relays become deenergized successively when the relay 11 is deenergized after having once been picked up to energize the relays 12 and 13. As long as the manually operated signal key K is kept in the normal position, that is, the position shown in Fig. 1, and the relay 11 is operated at its normal rate as will appear later in the description, relay 13 normally will remain constantly energized due to the fact that its release period is made longer than the interval that relay 12 normally remains deenergized.

During the interval that relay 12 remains up after the relay 11 drops the coils 9 and 10 are connected to the output of the generator G by a circuit that can be traced from the upper terminal of generator G along wire 17, coils 9 and 10 in series, wire 18, back contact of armature 19 of relay 11, contact 20 of the signal key K, front contact of armature 21 of relay 12 and wire 22 to the lower terminal of the generator G. With the key K depressed so as to bring the contact 20 to its dotted line position the above traced circuit is completed from the contact 20 through the front contact of armature 23 of relay 13 and wire 22 to the lower terminal of generator G.

It follows from the foregoing that with relay 11 operated at its normal rate the traffic rails are periodically supplied with impulses of carrier current which are modulated by either M1, M2, M3 or M4 according to the position of the handle 3 for the brake valve EV. That is to say, each of the modulated conditions of the carrier current impulses represents a functional condition of the engineer's brake valve. Under the normal position of the signal key K the duration of the impulse is equal to the slow-release period of the relay 12, while with the signal key K depressed to bring the contact 20 to its dotted line position, the duration of the impulse is made equal to the combined release periods of relays 12 and 13, inasmuch as the output circuit is then held closed at the front contact of the armature 23 of relay 13 and will not be opened until that relay has become deenergized.

Figure 2:
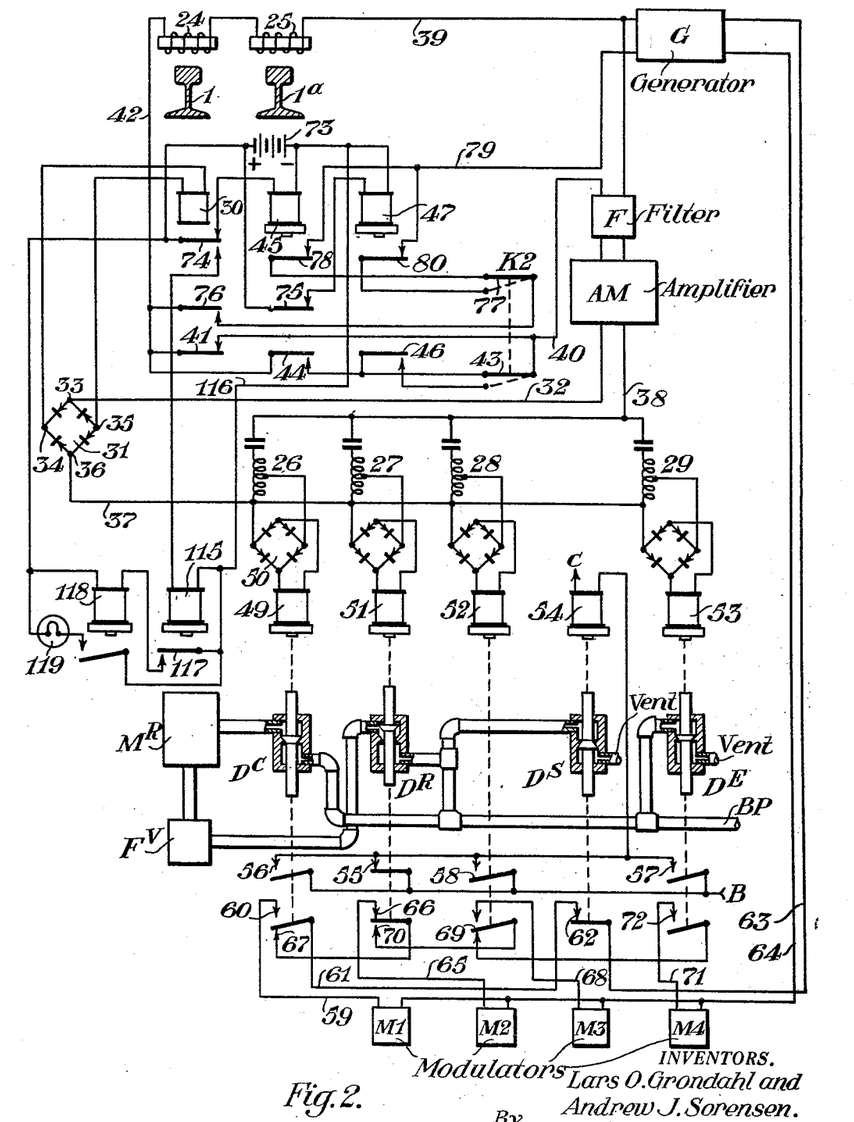
Fig. 2 is a diagrammatic view of the auxiliary brake controlling mechanism located at another point on a train for reproducing functions of the usual engineer's brake valve on the locomotive, together with apparatus to receive the transmitted influence from the locomotive, and to return an indication influence to the locomotive to indicate the condition of the auxiliary mechanism. While the apparatus of Fig. 2 may be located at any point on the train it will be referred to in the following description as being mounted in the caboose of a freight train.

Referring to Fig. 2, the caboose is provided with inductor coils 24 and 25 mounted in an inductive relation with the traffic rails 1 and 1ª, respectively, in a manner similar to the coils 9 and 10 on the locomotive. These coils 24 and 25 are at times connected to an input circuit leading to a filter F tuned to pass energy at the frequency of the carrier current of the generator G on the locomotive to the input of an amplifier AM. Assuming the caboose apparatus to be all deenergized this input circuit can be traced from the left-hand terminal of the filter F along wire 40, contact 43 of a manually operated signal key K2, back contact of armature 44 of a relay 45 to be described later, wire 42, coils 24 and 25 in series and wire 39 to the right-hand terminal of the filter F. This input circuit is also closed from the wire 40 to wire 42 by the front contact of the armature 41 of a sensitive relay 30 to be described later around the back contact of armature 44. When the signal key K2 is depressed to bring contact 43 to its dotted line position, this input circuit includes the back contact of armature 46 of a relay 47 and the back contact of armature 44 of relay 45 in series.

The output of the amplifier AM is connected to the winding of the sensitive relay 30 through the full-wave rectifier 31 and to a network of sharply tuned circuits 26, 27, 28 and 29 arranged in parallel in the input side of rectifier 31. To be explicit this output circuit extends from the left-hand terminal of amplifier AM along wire 32, input terminal 33 of rectifier 31, output terminal 34, winding of relay 30, output terminal 35 of rectifier 31, input terminal 36, wire 37, thence through the network of circuits 26, 27, 28 and 29 in parallel and wire 38 to the right-hand terminal of the amplifier AM. The circuits 26, 27, 28 and 29 are tuned to be responsive to the frequencies of the modulators M1, M2, M3 and M4 of Fig. 1, respectively. A portion of the circuit 26 is connected with the input terminals of a full-wave rectifier 50, the output terminals of which are connected with the magnet 49 to energize that magnet in response to impulses of carrier current modulated at the frequency of M1. In a similar manner the magnets 51 and 53 and the relay 52 are supplied with energizing current from the tuned circuits 27, 29 and 28, respectively. The filter F and the amplifier AM may be any one of many well-known types but as their specific type forms no part of our invention they are shown in Fig. 2 diagrammatically only in order to simplify the drawings. Filter F serves to prevent influences of current from sources of power other than generator G of Fig. 1 on the apparatus of Fig. 2.

It follows from the foregoing that an impulse of carrier current of the frequency of the generator G of Fig. 1 modulated at the frequency of M1 causes the relay 30 to be picked up and the magnet 49 to be energized. When the modulation is that of M2, M4 or M3 then the magnets 51 or 53, or the relay 52 is energized by the impulse while the relay 30 will be operated under all conditions of modulation. At the end of the impulse the relay 30 immediately drops but the magnets 49, 51 and 53 and the relay 52 will remain energized for a period due to the fact that each is provided with slow-release characteristics.

The caboose is provided with a main reservoir $M^R$, a feed valve $F^V$ and a plurality of electropneumatic valves $D^C$, $D^R$, $D^S$ and $D^E$, so arranged as to reproduce functions of the engineer's brake valve on the locomotive. Of course, the caboose will necessarily be provided with a compressor, pressure gages and associated apparatus necessary to insure proper supply of air pressure in the main reservoir $M^R$. The valves $D^C$, $D^R$ and $D^E$ are each biased to a closed position and each is lifted to an open position when the associated magnet 49, 51 or 53, respectively, is energized. The valve $D^S$ is biased to an open position and is held closed as shown in Fig. 2 when its associated magnet 54 is energized. When the valve $D^C$ is open, that is, when its magnet 49 is energized, the main reservoir $M^R$ is connected to the brake pipe BP and the brake controlling mechanism in the caboose reproduces the condition which exists on the locomotive when the engineer's brake valve is at the release position. With the valve $D^R$ opened by its magnet 51 being energized, the brake pipe is connected to the feed valve $F^V$ and the caboose mechanism reproduces the control of the brake pipe pressure existing on the locomotive when the engineer's valve is at the running position. When the valve $D^S$ is open, that is, when its magnet 54 is deenergized, the brake pipe is connected to the atmosphere through a vent of such characteristics as to produce a reduction in the brake pipe pressure of substantially the service rate of the usual engineer's brake valve to effect a service application of the brakes. When valve $D^E$ is opened by its magnet 53 being energized, the brake pipe is connected to the atmosphere through a vent of such characteristics as to cause an emergency rate of reduction of the brake pipe pressure and an emergency application of the brakes. When the valve $D^S$ is held closed by magnet 54 being energized and the remaining three valves are closed as the result of their magnets being deenergized both the supply and the exhaust to the brake pipe are blanked and the auxiliary mechanism in the caboose reproduces the lap condition of the brake valve on the locomotive.

The magnets 49, 51 and 53 and the relay 52 are each energized by an associated tuned circuit of the network connected to the output of the amplifier AM as has been described above. Each of the magnets is made slow-releasing so that the corresponding valve is held in the energized position when its magnet is intermittently energized in response to periodic impulses applied to the input of the amplifier AM. Attached to the movable part of each valve are circuit controlling contacts adapted to engage front contacts whenever the associated magnet is energized and to drop into engagement with back contacts when its magnet is deenergized. The magnet 54 associated with the service brake valve $D^S$ is supplied with current by a local circuit that is governed by contacts actuated by the valves $D^C$, $D^R$ and $D^E$ and by the relay 52. This circuit extends from the positive terminal B of any convenient source of power not shown, through front contact 55 of valve $D^R$ and winding of magnet 54 to the negative terminal C of the source of power. In parallel with the front contact 55 are the front contact 56 of valve $D^C$, front contact 57 of valve $D^E$ and the front contact of armature 58 of relay 52 as will be readily understood by an inspection of Fig. 2. It follows that magnet 54 is energized to close the service valve $D^S$ whenever a magnet of any one of the other valves $D^C$, $D^R$ or $D^E$ is energized or when the relay 52 is energized. It is to be understood that while the service valve $D^S$ is the one here shown as being held energized under all conditions so as to insure the "closed circuit" principle for our invention any one of the other valves could be so controlled should it seem desirable to do so.

In order that the auxiliary mechanism of Fig. 2 may transmit return indication impulses to the locomotive, the caboose is provided with a generator G of carrier current and four modulators M1, M2, M3 and M4. The generator and the modulators of Fig. 2 may be and preferably are similar to the generator and modulators on the locomotive and if desirable may be of the same corresponding frequencies. Each of the modulators is rendered active under a given condition of the auxiliary brake controlling mechanism in the following manner. When valve $D^C$ is held open by the energizing of its magnet 49 a circuit for the modulator M1 is completed along wire 59, front contact 60 of valve $D^C$, wire 61, front contact 62 of service valve $D^S$, wire 63, generator G and wire 64 to the opposite terminal of modulator M1. With the running valve $D^R$ held open by the energizing of its magnet 51 the modulator M2 is made effective, as its circuit is completed along wire 65, front contact 66 of valve $D^R$, back contact 67 of valve $D^C$, wire 61, front contact 62 of valve $D^S$, wire 63, generator G and wire 64 to the opposite terminal of M2. When the relay 52 is energized the circuit to the modulator M3 is completed along wire 68, front contact of armature 69 of relay 52, back contact 70 of valve $D^R$ and then as above traced to the generator G and thence by the wire 64 to the opposite terminal of M3. When the emergency valve $D^E$ is open the circuit to the modulator M4 is closed along wire 71, front contact 72 of valve $D^E$, back contact of armature 69 and thence as before traced through the generator G and wire 64 to the opposite terminal of M4. It is to be noted that the deenergizing of the operating magnet 54 for the service valve $D^S$ opens a connection at the front contact 62 to all the modulators, and thus under a service application condition of the auxiliary mechanism the current supplied by the generator G in the caboose is non-modulated.

The inductor coils 24 and 25 are connected to the output of the generator G in the caboose by the relays 30, 45 and 47 which function in a manner similar to the relays 11, 12 and 13 on the locomotive. When relay 30 is picked up in a manner to be shortly described, current is supplied from a battery 73 through the front contact of its armature 74 to the winding of the relay 45 to energize that relay, and then as soon as the relay 45 is picked up, current from the battery 73 flows through the front contact of the armature 75 of relay 45 to the winding of the relay 47 to energize that relay. When relay 30 becomes deenergized the relays 45 and 47 are deenergized successively, each remaining closed for a slow-release period after its energizing circuit is opened. Under the normal operation of the relay 30 as will appear later, the relay 47 will remain constantly energized due to the fact that its release period is made longer than the interval the relay 45 normally remains deenergized. During the period the relay 45 remains up after the relay 30 drops, the output circuit of the generator G is closed from the top terminal of generator G along wire 39, coils 25 and 24, wire 42, back contact of armature 76, contact 77 of signal key K2, front contact of armature 78 of relay 45 and wire 79 to the lower terminal of generator G. Whenever the key K2 is depressed to bring contact 77 into its dotted line position the output circuit includes the front contact of armature 80 of the relay 47. It follows that under the normal position of the key K2 the impulses of carrier current have a duration equal to the slow-release period of the relay 45 and the duration can be made equal to the combined release periods of relays 45 and 47 by depressing the key K2. In either event the modulation of the impulses supplied to the traffic rails will be in accordance with the condition of the auxiliary brake controlling mechanism, being that of M1 under the release condition, M2 for the running condition, M3 for lap and M4 for emergency, while under the service condition there will be no modulation.

In order that the indication impulses transmitted by the caboose equipment may be received at the locomotive there is provided receiving equipment on the locomotive which includes a filter F and an amplifier AM similar to the filter and amplifier in the caboose. The input circuit to the filter F on the locomotive extends along wire 81 leading from the left-hand terminal of the filter F, contact 82 of signal key K, back contact of armature 83 of relay 12 when that relay is deenergized, wire 18, coils 10 and 9 and wires 17 and 84 to the right-hand terminal of filter F. The filter F is tuned to pass carrier current of the frequency of the caboose generator G to the input of amplifier AM and to filter out the influences of other sources of power. Whenever the relay 11 is energized the input circuit just traced is closed from wire 81 to the wire 18 through the front contact of the armature 85. Also, when signal key K is depressed the input circuit is completed from wire 81 through contact 82 in its dotted line position, back contact of armature 86 of relay 13, back contact of armature 83 to wire 18, and thence as before traced.

The output side of amplifier AM on the locomotive supplies energy to the relay 11 through a rectifier 93 and to a network of sharply tuned circuits 87, 88, 89 and 90 arranged in parallel in the input side of rectifier 93. Specifically this output circuit for the locomotive amplifier includes wire 91 from the left-hand terminal of AM, input terminal 92 of a full-wave rectifier 93, output terminal 94, winding of relay 11, output terminal 95 of rectifier 93, input terminal 96, wire 97, and thence through the network of selective circuits in parallel and wire 98 to the right-hand terminal of amplifier AM. A portion of the circuit 87, which is tuned to be responsive to the modulating frequency of the modulator M1 in the caboose, is connected to the input terminals of a full-wave rectifier 99, the output terminals of which are connected to a slow-release relay 100. In a like manner the circuits 88, 89 and 90, tuned to the frequency of the caboose modulators M2, M3 and M4, respectively, are arranged to supply energy to the relays 101, 102 and 103, respectively. These relays are arranged to control indicating devices 104, 105, 106 and 107 each of which may be a magnet, a light or a bell by circuits easily traced from a source of current such as a battery 108.

On the locomotive there is provided a slow-release relay 109 which is energized by a circuit from the positive terminal of battery 14, back contact of armature 15 of relay 11, winding of relay 109 and wire 110 to the negative terminal of battery 14. The relay 109 controls at the back contact of its armature 111 a circuit to a slow-release relay 112, while the relay 112 in turn controls at the front contact of its armature 113 the circuit to a signaling device 114 as will be readily understood from Fig. 1. The function of relays 109 and 112 and the signaling device 114 will appear when the operation of the system is described. The caboose apparatus includes a slow-release relay 115 energized by a circuit from the positive terminal of battery 73 through the back contact of armature 74 of relay 30, winding of relay 115 and to the negative terminal of battery 73 by wire 116. This relay 115 controls at the back contact of its armature 117 a circuit to a slow-release relay 118 which in turn controls a circuit to a signaling device 119 in a manner similar to that of relays 109 and 112 on the locomotive. The function of the relays 115 and 118 will shortly appear.

In describing the operation of our system we will assume that the engineer's brake valve EV is in the running condition during which the modulator M2 is active to modulate the carrier current supplied by the generator G. Before the system is cut into service the relays 11, 12 and 13 are, of course, all deenergized so that as connection is made to the source of power, which in this instance is the battery 14, by the closing of the usual starting switch heretofore mentioned the relays 12 and 13 are first successively energized and then the circuit to the relay 12 is opened at the back contact of the armature 122 of relay 13. During the slow-release period of relay 12 the output circuit is closed at the front contact of its armature 21 and the back contact of the armature 19 of relay 11 as relay 11 still remains deenergized. At the expiration of the release period of relay 12 the latter will become deenergized to open the output circuit at the armature 21 and terminate the impulse of modulated carrier current being supplied to the traffic rails. This impulse modulated by M2 and supplied to the traffic rails will induce energy in the coils 24 and 25 at the caboose which is applied to the input circuit leading to the filter F and amplifier AM. At the very start of the impulse this input circuit will include the coils 24 and 25, wire 39, filter F, wire 40, contact 43, back contact of armature 44 of relay 45 and wire 42 to the coils 24 and 25. The impulse after being passed by the filter F to the amplifier AM and amplified will energize relay 30 and cause the tuned circuit 27 to pick up the magnet 51. It will be recalled that circuit 27 is the one tuned at the frequency of the modulator M2 on the locomotive. As the relay 30 picks up, the relays 45 and 47 are in turn energized and while the input circuit is opened at the back contact of the armature 44 of relay 45, it is now held closed at the front contact of armature 41 of relay 30. With magnet 51 energized the valve $D^R$ is opened to connect the brake pipe BP to the feed valve $F^V$ and to close the circuit to the magnet 54 which picks up and closes the valve $D^S$. The auxiliary mechanism has now established the running condition of the brake pipe pressure and closed the circuit to the caboose modulator M2 to render that modulator active to modulate the current supplied by the caboose generator G. At the end of the impulse transmitted from the locomotive, which as previously stated will have a duration equal to the release period of the relay 12, the relay 30 immediately drops to close the output circuit on the caboose at the back contact of its armature 76 as relay 45 is now energized to close the front contact of its armature 78. The caboose equipment now functions to supply to the traffic rails an impulse of carrier current modulated by the caboose modulator M2. The duration of this impulse is equal to the release period of the relay 45.

On the locomotive the deenergizing of relay 12 to terminate the sending of the impulse closes the input circuit from the coils 9 and 10 to the filter F at the back contact of its armature 83, and thus the locomotive apparatus is ready to receive the impulse transmitted by the caboose equipment. This impulse from the caboose when picked up by the coils 9 and 10 will be passed by the filter F to the amplifier AM and amplified to operate relay 11 and cause the circuit 88, tuned at the frequency of the modulator M2 in the caboose, to effect the energization of the relay 101. As relay 101 picks up, the indicating device 105 is illuminated to indicate the running condition of the auxiliary brake controlling mechanism. As the relay 11 picks up, the relay 12 is again energized. The input circuit on the locomotive is held closed as long as the impulse transmitted by the caboose equipment lasts at the front contact of armature 85 of relay 11 although it has been ruptured at the back contact of armature 83 of relay 12. At the expiration of the return indication impulse the caboose apparatus is transferred to its receiving condition and the relay 11 immediately drops to transfer the locomotive apparatus from its receiving condition to the transmitting condition. An impulse of carrier current modulated by M2 is again supplied to the traffic rails at the locomotive during the release period of relay 12 which causes the caboose relays 30, 45 and 47 to function as described above for the first impulse. From this point on there will be an alternate exchange of impulses between the locomotive and the caboose. Due to the slow-release characteristics of magnets 51 and 54 the auxiliary brake controlling mechanism is held constantly in the running condition in response to these intermittent impulses. Likewise, the slow-release characteristics of the relay 101 on the locomotive causes the indicating device 105 to be steadily illuminated.

In the caboose the relay 115 receives an energizing impulse each time the relay 30 is deenergized. The release period of the relay 115 is made slightly greater than the release period of the relay 12 and thus relay 115 remains steadily energized in response to the normal impulses transmitted by the locomotive equipment and the circuit to the relay 118 is held open all the time so that the signaling device 119 is normally inactive. In a similar manner the relay 109 on the locomotive receives an energizing impulse each time the relay 11 is deenergized and its release period is made slightly greater than that of the caboose relay 45 with the result that the relay 109 remains normally energized and the signaling device 114 normally inactive.

The release period of relay 12 on the locomotive and that of relay 45 in the caboose are preferably made substantially of equal durations. In connection with the normal operation of relays 11 and 12 it is noted that as relay 12 drops to terminate an outgoing control impulse it opens the circuit to relay 13. The return impulse at the caboose is immediately started after the termination of the control impulse and relays 11 and 12 are reenergized. The relay 12 is thus deenergized only for a relatively short interval, much less than the release period of relay 13, which is preferably made equal to that of relay 12. The result is that under normal operation the relay 13 is held energized. The operation of the relays 30 and 45 is similar to that of relays 11 and 12 and thus it follows that the slow-release relay 47 is also normally held energized.

From the foregoing description, it follows that under the running condition of the brake valve EV impulses of carrier current modulated at the frequency of M2 are alternately exchanged between the locomotive equipment and the caboose equipment which causes the auxiliary brake controlling mechanism to reproduce the running condition of the brake pipe pressure established by the brake valve EV, and the indicating device 105 to be continually displayed.

In the case the handle 3 of valve EV is moved to the release position the operation of the system will be the same except that the impulses sent out from the locomotive will be modulated at the frequency of M1. Impulses modulated by M1 when received at the caboose cause the tuned circuit 26 to energize magnet 49 to open the valve $D^C$ and establish the release condition of the auxiliary mechanism. It will be noted that the magnet 54 of the valve $D^S$ is now held energized by the circuit closed at the front contact 56 operated by the valve $D^C$. The return indication impulses are now modulated at the frequency of M1 to which the tuned circuit 87 on the locomotive is responsive to effect the energization of the relay 100 and cause the indicating device 104 to be displayed.

If the lap position is selected by the locomotive operator the impulses transmitted from the locomotive are modulated at the frequency of M3 to effect the energization of the relay 52 in the caboose. The energizing of relay 52 will hold the magnet 54 energized so that valve $D^S$ remains closed but as the magnets for the valves $D^C$, $D^R$ and $D^E$ are all deenergized these valves assume their closed positions and the auxiliary mechanism reproduces the lap condition of the brake pipe pressure established on the locomotive. The return indication impulses are now modulated at the frequency of M3 in the caboose which causes the energization of the relay 102 on the locomotive so that the indicating device 106 is displayed. In a like manner the emergency position of the handle 3 causes the outgoing impulses from the locomotive to be modulated by M4 which brings about the energizing of the magnet 53 in the caboose so that the auxiliary mechanism establishes an emergency application of the brakes. The return indication impulses are now modulated by M4 with the result that relay 103 is energized and the indicating device 107 illuminated. If a service condition is established at the brake valve EV the next outgoing impulse from the locomotive is non-modulated. The receipt of a non-modulated impulse at the caboose will result in magnets 49, 51 and 53 and the relay 52 all becoming deenergized. This set-up will effect the deenergizing of the magnet 54 so that the valve $D^S$ is opened to establish a service application of the brakes. As relay 30 remains deenergized no return indication impulse is sent out by the caboose apparatus and thus none of the indication devices on the locomotive will be displayed.

In the event the locomotive operator desires to transmit a signal message to the caboose operator he does so by depressing the signal key K which causes the relay 13 to be brought into play. The first impulse sent out from the locomotive after the key K is depressed will have a duration equal to the combined release periods of relays 12 and 13 due to the fact that the output circuit now includes the front contact of the armature 23 of relay 13. The receipt of the long impulse at the caboose will hold the relay 30 energized for the entire period. As previously stated, the release period of the relay 115 is made only slightly longer than the release period of relay 12 alone. Relay 115 thus is deenergized during the long impulse and closes the circuit to the relay 118 at the back contact of its armature 117. As the relay 118 picks up, the signaling device 119 is displayed. As long as the key K is held depressed, the relay 115 will be deenergized each impulse so that relay 118 is given an energizing impulse each impulse received from the locomotive. Relay 118 is provided with a slow-release period great enough to allow it to remain energized from one long impulse to the next and thus the signaling device 119 remains continuously displayed as long as the locomotive operator holds the signal key K depressed. By operating the key K in accordance with a prearranged code the locomotive operator can readily transmit a message that will be displayed to the caboose operator by the signaling device 119. As the caboose apparatus is not transferred from its receiving condition to its sending condition until the impulse from the locomotive has terminated, the caboose apparatus will function in the usual manner during the period a signal message is sent out from the locomotive.

If the caboose operator desires to transmit a code message to the locomotive operator he depresses the signal key K2 to bring the relay 47 into play. The return impulses are now given a duration equal to the combined release periods of relays 45 and 47 due to the fact that the caboose output circuit includes the front contact of the armature 80 of relay 47 when the key K2 is depressed. The relay 11 on the locomotive is held energized during the entire period of the long return impulse with the result that the relay 109 becomes deenergized due to the fact the relay 109 has a release period only slightly greater than that of the relay 45 alone. Relay 109 will therefore drop each impulse received on the locomotive to close the circuit to the relay 112 which in turn picks up to energize the signaling device 114. By operating the key K in accordance with the prearranged code the caboose operator can convey a message to the locomotive operator by means of the signaling device 114. As the locomotive apparatus is not transferred from its receiving condition to its sending condition until the completion of the return indication impulse, the locomotive apparatus will function in the normal manner even while the caboose apparatus is sending a message. It will be understood, of course, that the release periods of the magnets governing the brake controlling valves in the caboose and of the relays governing the indication devices on the locomotive are of sufficient durations to hold these magnets and relays energized even when the impulses transmitted are of the longer duration.

Figure 3:
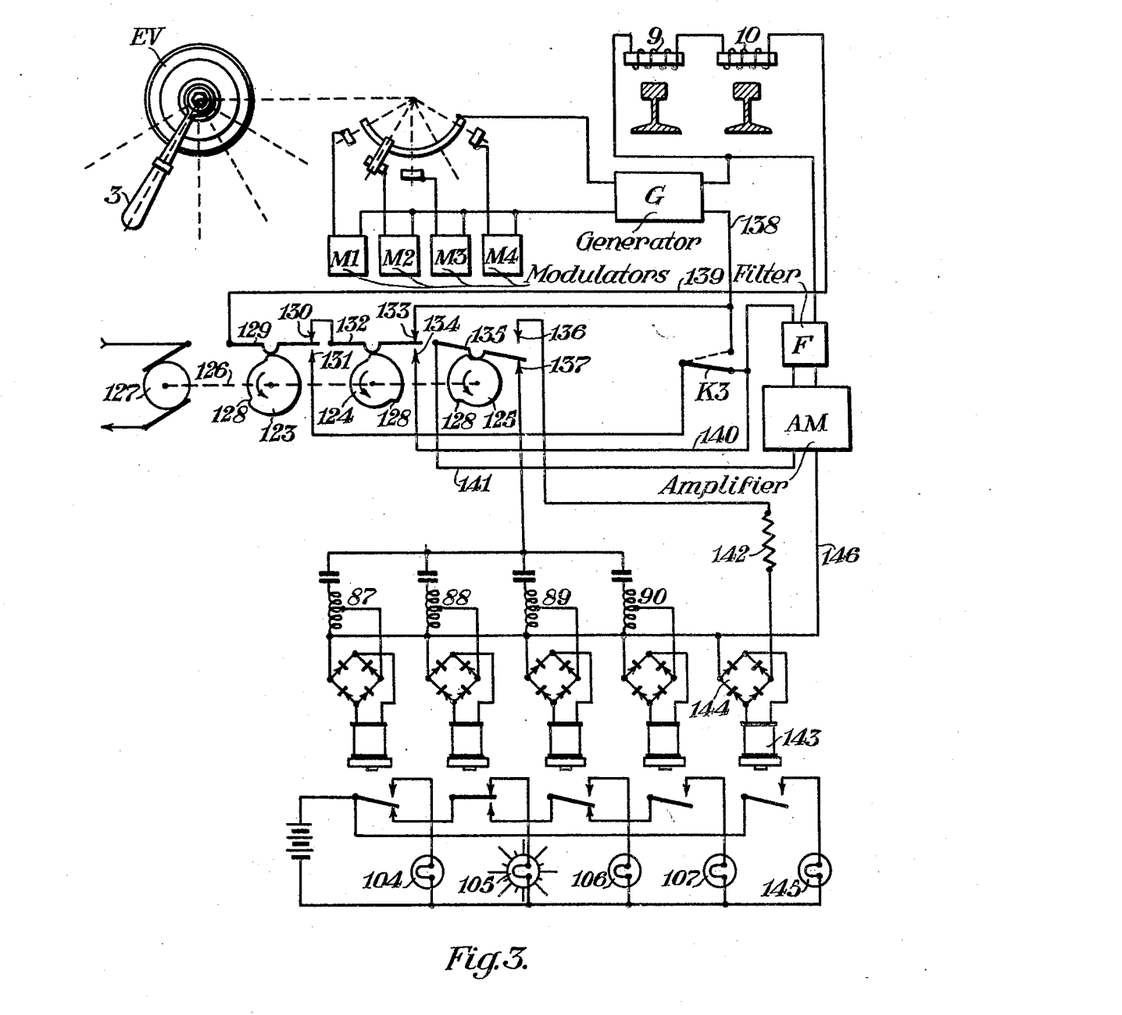
Fig. 3 is a diagrammatic view of a second form of locomotive carried apparatus also embodying our invention.

Referring to Fig. 3, which shows a second form of the locomotive apparatus, the locomotive is provided with a brake valve EV, generator G, modulators M1, M2, M3 and M4, filter F, amplifier AM and inductor coils 9 and 10 similar to the corresponding devices of Fig. 1. The output of the amplifier AM includes a network of sharply tuned circuits 87, 88, 89 and 90 similar to the network of Fig. 1. In this second form of the locomotive apparatus embodying our invention the dividing of time into control, indication and signaling periods is obtained by means of three rotating cams 123, 124 and 125. These cams are constructed of any suitable insulating material and are rigidly mounted on a shaft 126 as indicated by a dotted line. This shaft 126 is driven preferably through gears by a constant speed motor 127 supplied with power from any convenient source such as the usual headlight generator not shown.

Each cam is provided with a raised portion 128 which for cam 123 extends for two-thirds of its circumference and for cams 124 and 125 one-third of the circumference each.

The cam 123 is arranged to engage a contact spring 129 to raise it into engagement with a front contact 130 during the interval its raised portion 128 engages the spring 129 and permits the spring 129 to drop into engagement with a back contact 131 during the interval its raised portion 128 is out of engagement with the spring 129. The cam 124 is adapted to engage a contact spring 132 in a similar manner to actuate the contact spring 132 between a front contact 133 and a back contact 134. In a like manner cam 125 engages a contact spring 135 to actuate it between a front contact 136 and a back contact 137.

By means of these cams time is divided into three equal periods, control, indication and signaling. As the cams are rotated one-third of a rotation from the position shown in the figure in a counter-clockwise direction as indicated by the arrows, the cams 123 and 124 hold their contact springs 129 and 132, respectively, in engagement with their front contacts, and contact spring 135 engages its back contact 137. The output circuit of the generator G is completed during this first one-third of a rotation from one terminal of G along wire 138, front contact 133, spring 132, front contact 130, spring 129, wire 139, coils 10 and 9 in series and to the opposite terminal of the generator G. At the end of the first one-third rotation the contact spring 132 of cam 124 drops to engage the back contact 134 but the contact springs 129 and 135 remain in the position shown in the figure. During the second one-third rotation the input circuit leading to the filter F is completed from the left-hand terminal of filter F along wire 140, back contact 134, spring 132, front contact 130, spring 129, wire 139, coils 10 and 9 and to the right-hand terminal of the filter F. During both the first and second one-third rotation of the cams the output circuit for the amplifier AM is connected to the selective network through wire 141, contact spring 135 of cam 125, back contact 137, the selective network and wire 146 to the other terminal of the output circuit of amplifier AM. At the end of the second one-third rotation of the cams the spring 129 of cam 123 drops to engage the back contact 131 and the spring 135 of cam 125 is raised to engage the front contact 136 while the spring 132 of cam 124 is not moved at this time but remains in engagement with the back contact 134. In the case the manually operated signal key K3 occupies its normal position, that is, the position shown in the figure, the input circuit to the filter F is completed during the last one-third rotation of the cams along wire 140, signal key K3, back contact 131, spring 129, wire 139, coils 10 and 9 and to the filter F. The output of the amplifier AM is completed during this last one-third rotation through wire 141, spring 135, front contact 136, resistance 142, one side of rectifier 144, winding of a slow-release relay 143 and the other side of rectifier 144 back to the amplifier AM by wire 146. In the case the signal key K3 is raised to its dotted line position the input circuit on the locomotive is open during this last one-third rotation of the cams and the output circuit for the generator G is closed along wire 138, key K3, back contact 131, wire 139, coils 10 and 9 and to the generator G. At the end of a complete rotation the cams are back in the position shown in Fig. 3 and the above described cycle of operation will be repeated during each rotation of the cams.

With the caboose apparatus remaining the same as that shown in Fig. 2 the operation of the system embodying the apparatus of Fig. 3 will be similar to that described in connection with Figs. 1 and 2. During the first one-third rotation of the cams of Fig. 3 an impulse of carrier current modulated in accordance with the condition of the brake valve EV is transmitted to the caboose through the medium of the traffic rails. This impulse energizes the relay 30 in the caboose and the magnet of the auxiliary brake controlling mechanism corresponding to the modulation. At the end of the control period, that is, at the end of the first one-third rotation of the cams, the locomotive apparatus is shifted from its transmitting condition to its receiving condition and the caboose apparatus is permitted to function as previously pointed out to transmit a return indication impulse modulated in accordance with the condition of the auxiliary mechanism. This return impulse is picked up at the locomotive and amplified to cause a corresponding circuit of the selective network to be responsive to energize a relay that displays a corresponding indication. These control and indication impulses are alternately exchanged between the locomotive and the caboose apparatus to maintain a steady condition of the auxiliary mechanism and the indicating device. It will be understood that in this form of our invention the release period of the relay 45, which governs the length of the normal return impulse, will be so chosen as not to exceed the time required for the cams to make one-third of a rotation. When the locomotive operator desires to send a signal message he lifts the key K3 to cause the outgoing impulses to include two periods. That is, they include both the signaling period and the normal control period due to the fact that the output circuit is closed at the back contact 131 during the signaling period and then is closed by the front contacts 130 and 133 in series during the control period. This prolonged impulse will hold the relay 30 in the caboose energized for so long a period that the relays 115 and 118 function in the manner previously pointed out to actuate the signaling device 119. With the key K3 set in its normal position the locomotive apparatus is set to receive an impulse during each signaling period. Thus in the case the caboose operator sets his signal key K2 to prolong the return impulse through the signaling period the relay 143 on the locomotive will be energized during the signaling period by the return impulse irrespective of the modulation as its circuit is non-tuned. As relay 143 is provided with slow-release characteristics it will remain energized to close the circuit to the signaling device 145 as long as the return impulses are prolonged. In this connection it is to be pointed out that in this form of our invention the caboose relay 47 is provided with a release period that does not exceed the signaling period established by the cams on the locomotive.

Such a system as here described is highly selective and substantially immune to influences from outside sources of power. The division of time between brake actuating periods, return indication and manual signaling so function that there is no overlapping of these functions.

Although we have herein shown and described only certain forms of apparatus embodying our invention, it is understood that various changes and modifications may be made therein within the scope of the appended claims without departing from the spirit and scope of our invention.

Having thus described our invention, what we claim is:

1. A control system for the brakes of a railway train including, a brake controlling mechanism at one location on a train adapted to establish different functional conditions of the train brakes, an indicating mechanism at another location on the train capable of establishing a different indication for each condition of the brake controlling mechanism, a source of carrier current, means at each location to impress a different modulating frequency for each functional condition of the train brakes on said carrier current, transmitting means associated with each location to alternately exchange between the two locations periodic impulses of modulated carrier current, receiving means at each location responsive to modulated carrier current impulses, a plurality of multiple circuits at each location receiving current from the receiving means tuned respectively to the different modulating frequencies and each including a slow-release electromagnet for maintaining a steady condition of the associated mechanism corresponding to the modulation in response to the periodic impulses.

2. A control system for the brakes of a railway train including, a brake controlling mechanism at one location on a train adapted to establish different functional conditions of the train brakes, an indicating mechanism at another location on the train capable of establishing a different indication for each condition of the brake controlling mechanism, a source of carrier current, means at each location to impress a different modulating frequency for each functional condition of the train brakes on the carrier current, automatic means to divide time into control and indication periods arranged to transmit an impulse of modulated carrier current from the location of the indicating mechanism during the control period and to transmit an impulse from the location of the brake controlling mechanism during the indication period, receiving means responsive to modulated carrier current impulses, and a plurality of multiple circuits at each location receiving current from the receiving means tuned respectively to the different modulating frequencies and each including a slow-release electromagnet for maintaining a steady condition of the associated mechanism corresponding to the modulating frequency in response to the periodic impulses.

3. A control system for the brakes of a railway train including, a brake controlling mechanism at one location on a train adapted to establish different functional conditions of the train brakes, an indicating mechanism at another location on the train capable of establishing a different indication for each condition of the brake controlling mechanism, a signaling device at each location, a source of carrier current, means at each location to impress a different modulating frequency for each functional condition of the train brakes on the carrier current; automatic means to divide time into control, indication and signaling periods arranged to normally transmit an impulse of modulated carrier current from the location of the indicating mechanism during the control period and to transmit an impulse from the location of the brake controlling mechanism during the indication period; manually operated means at each location to at times cause the transmitted impulse to prevail also during the signaling period, receiving means responsive to modulated carrier current impulses, a plurality of multiple circuits at each location receiving current from the receiving means tuned respectively to the different modulating frequencies and each including a slow-release electromagnet for maintaining a steady condition of the associated mechanism corresponding to the modulating frequency in response to the periodic impulses, and means at each location responsive to the impulse during the signaling period for rendering the signaling device active.

4. A control system for the brakes of a railway train including, a brake controlling mechanism at one location on a train adapted to establish different functional conditions of the train brakes, an indicating mechanism at another location on the train capable of establishing a different indication for each condition of the brake controlling mechanism, a signaling device at each location, a source of carrier current, means at each location to impress a different modulating frequency for each functional condition of the train brakes on the carrier current; automatic means to divide time into control, indication and signaling periods arranged to normally transmit an impulse of modulated carrier current from the location of the indicating mechanism during the control period and to transmit an impulse from the location of the brake controlling mechanism during the indication period; manually operated means at each location to at times prolong the transmitted impulse to include the signaling period, receiving means responsive to modulated carrier current impulses, a plurality of multiple circuits at each location receiving current from the receiving means tuned respectively to the different modulating frequencies and each including a slow-release electromagnet for maintaining a steady condition of the associated mechanism corresponding to the modulating frequency in response to the periodic impulses, and means at each location responsive to prolonged impulses for rendering the signaling device active.

5. A control system for the brakes of a railway train including, a brake controlling mechanism at one location on a train, an indicating mechanism at another location on the train, a circuit means including a slow-release relay at each location to divide time into control and indication periods arranged to transmit a current impulse from the location of the indicating mechanism during the control period and to transmit a current impulse from the location of the brake controlling mechanism during the indication period, receiving means at each location responsive to impulses of current, a circuit including a quick-acting relay at each location receiving current from the receiving means to actuate the relay in step with the impulses, and a circuit controlling armature operated by the quick-acting relay to govern the slow-release relay.

6. A control system for the brakes of a railway train including, a brake controlling mechanism at one location on the train adapted to establish different functional conditions of the train brakes, an indicating mechanism at another location on the train capable of establishing a different indication for each condition of the brake controlling mechanism, a source of carrier current, means at each location to impress a different modulating frequency for each functional condition of the train brakes on the carrier current, a circuit means at each location including a slow-release relay to divide time into control and indication periods arranged to transmit a modulated current impulse from the location of the indicating mechanism during the control period modulated in accordance with the brake condition and to transmit a corresponding modulated current impulse from the location of the brake controlling mechanism during the indication period, receiving means at each location responsive to impulses of modulated current, a circuit net-work at each location including a quick-acting relay receiving current from the receiving means adapted to operate the quick-acting relay in step with the impulses irrespective of the modulating frequency, and a circuit controlling armature operated by the quick-acting relay to govern the slow-release relay.

7. A control system including; a mechanism having a control, an indication and a signaling condition; a quick-acting relay and a slow-release relay arranged when active for causing said mechanism to successively assume the control and indication conditions, a second slow-release relay normally inactive and adapted when active for causing the mechanism to assume its signaling condition, and a manually controlled means for rendering at times said second slow-release relay active and thereby causing said mechanism to successively assume its control, indication and signaling conditions.

8. A control system including, two spaced locations; a mechanism at each location having a control, an indication and a signaling condition; a transmitting and receiving means at each location adapted to exchange impulses of current of a given duration between the two locations for automatically establishing the control and the indication conditions of the two mechanisms, manually controlled means at each location each adapted to prolong the impulse transmitted at its location, and means at each location responsive to a prolonged impulse transmitted from the opposite location for causing the mechanism at its location to establish the signal condition as well as the control and the indicating conditions.

9. A control system for the brakes of railway trains including, a brake controlling mechanism at one location on a train, an indicating mechanism at a second location on the train, a signaling device at each of said locations, a transmitting and receiving means at each of said locations adapted to alternately exchange impulses of current of a given length between the locations to actuate the brake controlling and the indicating mechanisms, an electromagnetic means at each location adapted to prolong the impulse transmitted from the location at which it is located, means at each location responsive to prolonged impulses transmitted from the opposite location to render the signal device at its location active as well as the other mechanism at that location, and manually controlled means at each location to control the electromagnetic means.

10. A control system for the brakes of railway trains including, a brake controlling mechanism at one location on a train, an indicating mechanism at a second location on the train, a signaling device at each location, means including a quick-acting relay and a slow-release relay at each of said locations adapted to alternately exchange between the locations impulses of current having a duration equal to the release periods of the slow-release relays to actuate the brake controlling and the indicating mechanism, a second slow-release relay at each location adapted when active to prolong the impulse transmitted from the location at which it is located by an interval equal to its release period, means at each location responsive to prolonged impulses transmitted from the opposite location to render the signal device at its location active as well as the other mechanism at that location, and manually controlled means at each location to render active the second mentioned slow-release relay.

11. A control system for the brakes of a railway train including, a brake controlling mechanism at one location on a train adapted to establish different functional conditions of the train brakes, an indicating mechanism at another location on the train capable of establishing a different indication for each condition of the brake controlling mechanism, a signaling device at each location, a source of carrier current, means at each location to impress on the carrier current a different modulating frequency for each functional condition of the train brakes; automatic means to divide time into control, indication and signaling periods arranged to normally transmit an impulse of modulated carrier current from the location of the indication mechanism during the control period and to transmit an impulse from the location of the brake controlling mechanism during the indication period; manually operated means at each location to cause the transmitted impulse to prevail also during the signaling period, receiving means at each location selectively responsive to the different modulations of the carrier current impulses to establish corresponding conditions of the respective brake controlling and indicating mechanisms, and means at each location controlled by the receiving means responsive to the current impulse during the signaling period irrespective of the modulation for rendering the signaling device active.

In testimony whereof we affix our signatures.

LARS O. GRONDAHL.
ANDREW J. SORENSEN.